No. 767,223. PATENTED AUG. 9, 1904.
H. T. HALLOWELL.
SHAFT HANGER.
APPLICATION FILED AUG. 14, 1902.
NO MODEL.
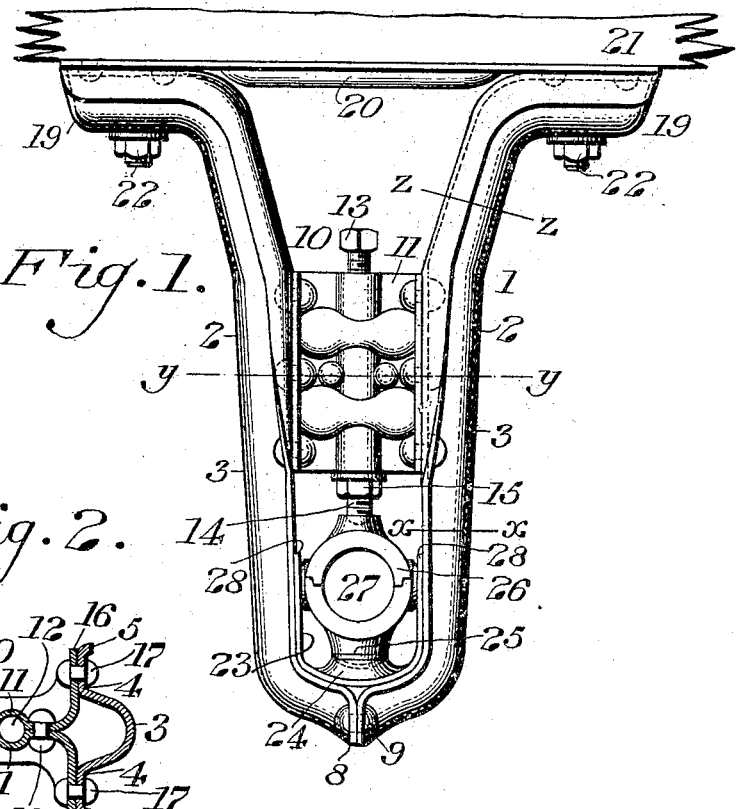
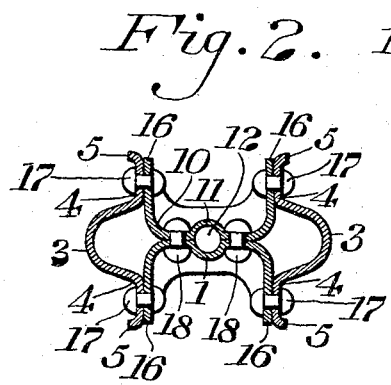
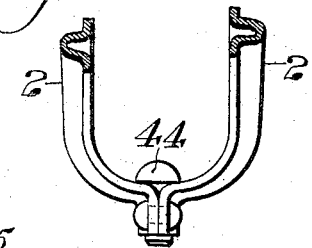
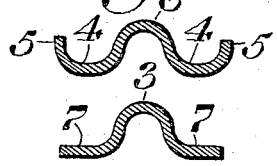
Witnesses
P. F. Nagle
L. Douville
Inventor
Howard T. Hallowell,
By Niedersheim & Fairbanks,
Attorneys No. 767,223. Patented August 9, 1904.

UNITED STATES PATENT OFFICE.

HOWARD T. HALLOWELL, OF DAVISGROVE, PENNSYLVANIA, ASSIGNOR TO STANDARD PRESSED STEEL COMPANY, A CORPORATION OF PENNSYLVANIA.

SHAFT-HANGER.

SPECIFICATION forming part of Letters Patent No. 767,223, dated August 9, 1904.

Application filed August 14, 1902. Serial No. 119,616. (No model.)

*To all whom it may concern:*

Be it known that I, HOWARD T. HALLOWELL, a citizen of the United States, residing at Davisgrove, county of Montgomery, State of Pennsylvania, have invented a new and useful Improvement in Shaft-Hangers, of which the following is a specification.

My invention consists of an improved construction of a shaft-hanger, more particularly adapted for what is known as "counter-shaft" hangers, wherein I dispense with an end clamp or yoke, making a very simple and inexpensive structure.

It also consists of a novel method of making the strength of legs in proportion to the size of frame and the work required of the same, whereas in small frames I merely use the hollow longitudinal ribs for strength; but in larger and stronger frames I prefer to add strengthening-flanges, which can also be regulated as to depth, thereby enabling the legs to be made with ease to suit the various requirements.

It further consists of novel details of construction, all as will be hereinafter fully set forth, and particularly pointed out in the claims.

Figure 1 represents a side elevation of a novel construction of a hanger embodying my invention. Fig. 2 represents a section on line *y y*, Fig. 1. Fig. 3 represents a section on line *z z*, Fig. 1. Fig. 4 represents a section on line *x x*, Fig. 1, showing how I dispense with flanges 5 for legs for small-size hangers, above explained. Figs. 5 and 6 represent modified constructions showing the lower portions of hanger-legs embodying my invention.

Similar numerals of reference indicate corresponding parts in the figures.

1 designates a shaft-hanger, the same consisting of legs 2, which are provided with longitudinally-extending ribs or bulged portions 3, which are deflected outwardly, as at 4 and 7. (Shown in Figs. 3 and 4.) These flanges are again deflected where additional strength is desired, terminating into flanges 5, which may extend from end to end of leg, if desired. The legs terminate in the downwardly-deflected flanges or members 8, which preferably meet a similar member on the opposite leg, said flanges 8 being held together by means of the rivets 9 or other suitable fastening devices.

10 designates an intermediate brace, which consists in the present instance of two plates having the central or juxtaposed portions 11, with hollow strengthening-ribs, which are bulged out to form the way or bearing 12, in which is located the adjusting device 13, the lower portion 14 of which is threaded and provided with the jam-nut 15, the object of which is evident. Where lateral adjustment is desired, I prefer to put adjusting devices in a slotted hole between the plates loosely.

16 designates end portions of the intermediate brace, which are deflected outwardly and secured to the portions 4 by means of the rivets 17 or other suitable fastening devices, it being apparent that the abutting portions of the intermediate brace are now shown secured by the rivets 18 or their equivalents; but these are not essential in all cases.

19 designates the feet of the hanger, which are secured to the plate or base portion 20 in any suitable manner, although it is evident that said base portion may be omitted in some instances, if desired, said feet being secured to the timber 21 by the bolts or devices 22.

23 designates a thin sheet-metal seat, which is of substantially U shape and is secured in or between the lower portions of the hanger-legs, said seat having the raised portion 24, which is provided with a depression therein for the reception of the lower portion 25 of the box 26, the sides 27 of which contact with the upright portions 28 of said seat, while the top of said box is engaged by the lower extremity of the adjusting device 14.

In place of the seat 23 (seen in Fig. 1) I may employ the support 44 (seen in Fig. 5) to receive the shaft-bearing or box.

It will be apparent that various changes may be made by those skilled in the art which will come within the scope of my invention, and I do not therefore desire to be limited in every instance to the exact construction herein shown and described.

Having thus described my invention, what I claim as new, and desire to secure by Letters Patent, is—

1. A shaft-hanger, comprising a pair of legs, said legs having longitudinally-extending hollow ribs terminating in strengthening-flanges, there being feet on said legs, the lower ends of the latter being deflected inwardly, and having their lower terminals abutting against each other, and suitable fastening devices for securing said lower terminals in position.

2. A shaft-hanger, comprising a pair of legs, said legs having longitudinally-extending hollow ribs and laterally and outwardly deflected strengthening-flanges, there being feet on said legs, the lower ends of the latter being deflected inwardly, and having their terminals in contact with each other, suitable fastening devices for securing said lower terminals in position, and a box, and means for supporting said box within said hanger-legs.

3. A shaft-hanger, comprising a pair of legs, said legs having longitudinally-extending hollow ribs and outwardly-deflected flanges, there being feet on said legs, the ends of the latter being deflected inwardly, and having their lower terminals in contact with each other, suitable fastening devices for securing said lower terminals in position, and an intermediate brace composed of a plurality of members with outwardly-deflected flanges secured to said hanger-legs.

4. A shaft-hanger, comprising a pair of legs, said legs having longitudinally-extending hollow ribs and flanges, there being feet on said legs, the ends of the latter being deflected inwardly, and having their lower terminals in contact, suitable fastening devices for securing said lower terminals in position, an intermediate brace composed of a plurality of plate members secured to said hanger-legs, and a journal-box secured intermediately of said legs and brace.

5. A shaft-hanger, comprising a pair of legs, said legs having longitudinally-extending ribs and outwardly-deflected flanges, there being feet on said legs, the end of the latter being deflected inwardly, and having their lower terminals in contact, suitable fastening devices for securing said lower terminals in position, a seat located within the lower portion of said hanger-legs, and a box supported in said seat.

6. A shaft-hanger, comprising a pair of legs, each of said legs having longitudinally-extending hollow ribs and terminating in outwardly-deflected flanges, there being feet on said legs, the ends of the latter being deflected inwardly and abutting each other, suitable fastening devices passed through and securing said lower terminals in position, a brace intermediate of said legs and composed of a plurality of plates attached thereto, an adjusting device between said plates, a seat located between the lower portions of said legs, and a journal-box located between said seat and adjusting device.

7. In a shaft-hanger comprising a plurality of legs, a brace secured to said legs, said brace consisting of a plurality of plate portions, there being hollow strengthening-ribs in said plate, means for attaching said plates to said legs, an adjusting device between said plates, means for securing the lower ends of said legs in contact with each other and a box located between said adjusting device and the lower portions of said legs.

8. A shaft-hanger comprising a pair of legs having feet, each of said legs having longitudinally-extending strengthening-ribs and laterally and outwardly deflected flanges, said outwardly-deflected flanges terminating near the middle of said legs, an intermediate brace composed of a plurality of plates having flanges secured to said legs, an adjusting device mounted in said flanges, the lower ends of said legs being deflected inwardly and secured in contact with each other and a box located between the lower portions of said legs and said adjusting device.

9. A shaft-hanger comprising a pair of legs terminating in feet, said legs having longitudinally-extending hollow ribs terminating in strengthening-flanges, the lower ends of the legs being inwardly curved, suitable fastening devices passed through and securing the lower ends of said legs together and a journal-box located between said legs and supported by said inwardly-curved portions.

10. A shaft-hanger comprising a pair of legs, said legs having longitudinally-extending strengthening-ribs terminating in longitudinal strengthening-flanges and abutting terminals, an intermediate brace connecting said legs, a journal-box intermediate said legs and the lower portion of said legs being united to each other, forming a rigid connection for the lower depending portions of said legs so that the withdrawal of the journal-box in a downward direction is prevented.

11. A shaft-hanger comprising a journal-box, a pair of legs having longitudinally-extending hollow ribs terminating in strengthening-flanges, the lower ends of which legs converge and support the weight of the journal-box upon their converging portions.

12. A shaft-hanger comprising a journal-box, a pair of legs having longitudinally-extending hollow ribs terminating in strengthening-flanges, the lower ends of the legs converging toward each other and secured to each other below the point of support of the journal-box upon the legs.

HOWARD T. HALLOWELL.

Witnesses:
E. HAYWARD FAIRBANKS,
C. D. McVAY.